US010396500B2

(12) United States Patent
Lyall et al.

(10) Patent No.: US 10,396,500 B2
(45) Date of Patent: Aug. 27, 2019

(54) ELECTRICALLY CONDUCTIVE CONDUIT ASSEMBLY

(71) Applicant: Norma U.S. Holding LLC, Auburn Hills, MI (US)

(72) Inventors: Brant Lyall, Walled Lake, MI (US); David Peterson, Ortonville, MI (US); Brian Ignaczak, Rochester, MI (US)

(73) Assignee: Norma U.S. Holding LLC, Auburn Hills, MI (US)

( * ) Notice: Subject to any disclaimer, the term of this patent is extended or adjusted under 35 U.S.C. 154(b) by 0 days.

(21) Appl. No.: 15/689,184

(22) Filed: Aug. 29, 2017

(65) Prior Publication Data

US 2018/0062322 A1    Mar. 1, 2018

Related U.S. Application Data

(60) Provisional application No. 62/381,862, filed on Aug. 31, 2016.

(51) Int. Cl.
| | |
|---|---|
| *H01R 13/648* | (2006.01) |
| *H01R 13/655* | (2006.01) |
| *H05B 3/14* | (2006.01) |
| *H05B 3/54* | (2006.01) |
| *F16L 11/127* | (2006.01) |
| *F16L 53/35* | (2018.01) |

(52) U.S. Cl.
CPC ......... *H01R 13/655* (2013.01); *F16L 11/127* (2013.01); *F16L 53/35* (2018.01); *H01R 13/6485* (2013.01); *H05B 3/146* (2013.01); *H05B 3/54* (2013.01); *H05B 2214/04* (2013.01)

(58) Field of Classification Search
CPC .......................... H01R 13/655; H01R 13/6485
USPC ........................................................ 439/100
See application file for complete search history.

(56) References Cited

U.S. PATENT DOCUMENTS

| | | | |
|---|---|---|---|
| 3,580,983 | A | 5/1971 | Jackson |
| 3,914,002 | A | 10/1975 | Berliner et al. |
| 3,963,856 | A | 6/1976 | Carlson et al. |
| 5,971,377 | A | 10/1999 | Knorr |
| 6,793,997 | B2 | 9/2004 | Schmitz |
| 6,881,933 | B2 | 4/2005 | Wickel et al. |
| 6,996,337 | B2 | 2/2006 | Auber |
| 7,097,452 | B2 | 8/2006 | Friedman |
| 7,190,892 | B2 | 3/2007 | Kertesz |
| 7,853,132 | B2 | 12/2010 | Muller |
| 8,395,474 | B2 | 3/2013 | Tanba et al. |
| 8,526,801 | B2 | 9/2013 | Borgmeier et al. |
| 8,556,300 | B2 | 10/2013 | Isenburg et al. |

(Continued)

FOREIGN PATENT DOCUMENTS

WO    WO2015/097498    7/2015

*Primary Examiner* — Abdullah A Riyami
*Assistant Examiner* — Vladimir Imas
(74) *Attorney, Agent, or Firm* — Harness, Dickey & Pierce, P.L.C.

(57) ABSTRACT

A conduit assembly with a tube formed from a polymeric material with a nanoparticulate component. The polymeric material has an electrical conductivity in a range between $1\times10^{-14}$ and $4.7\times10^{6}$ (S/m) at 20° C. An electrical contact is electrically coupled with the conduit assembly to receive electrical current. A ground is electrically coupled with the conduit assembly to ground the electrical current passed through the conduit assembly.

11 Claims, 8 Drawing Sheets

(56) References Cited

U.S. PATENT DOCUMENTS

| | | | |
|---|---|---|---|
| 8,591,241 B2 | 11/2013 | Rosenfeldt et al. | |
| 8,743,203 B2* | 6/2014 | Karner | B29C 45/0017 |
| | | | 348/148 |
| 8,890,039 B2* | 11/2014 | Etscheid | G05D 23/1912 |
| | | | 219/492 |
| 8,921,744 B2 | 12/2014 | Rosenfeldt et al. | |
| 8,925,573 B2* | 1/2015 | Borgmeier | F16L 25/01 |
| | | | 137/341 |
| 8,965,187 B2 | 2/2015 | Borgmeier et al. | |
| 9,074,053 B2 | 7/2015 | Locke et al. | |
| 9,103,481 B2 | 8/2015 | Schwarzkopf et al. | |
| 9,133,965 B2 | 9/2015 | Goering et al. | |
| 9,151,418 B2 | 10/2015 | Goering et al. | |
| 9,303,805 B2 | 4/2016 | Schwarzkopf et al. | |
| 9,765,271 B2* | 9/2017 | Myrick | C06B 45/30 |
| 2003/0034648 A1* | 2/2003 | Zitkowic, Jr. | F16L 37/144 |
| | | | 285/120.1 |
| 2005/0011572 A1 | 1/2005 | Belcher | |
| 2005/0042922 A1 | 2/2005 | Haller et al. | |
| 2005/0271838 A1 | 12/2005 | Aisenbrey | |
| 2006/0113696 A1 | 6/2006 | Aisenbrey | |
| 2009/0238547 A1 | 9/2009 | Borgmeier | |
| 2010/0175469 A1 | 7/2010 | Ni | |
| 2012/0291880 A1 | 11/2012 | Eckardt et al. | |
| 2012/0291881 A1 | 11/2012 | Eckardt et al. | |
| 2013/0220467 A1 | 8/2013 | Ristovski et al. | |
| 2013/0291904 A1 | 11/2013 | Carlson et al. | |
| 2013/0292935 A1 | 11/2013 | Isenburg et al. | |
| 2013/0294757 A1 | 11/2013 | Westmeier et al. | |
| 2013/0299030 A1 | 11/2013 | Goering et al. | |
| 2013/0336643 A1 | 12/2013 | Borgmeier et al. | |
| 2014/0069621 A1 | 3/2014 | Mann et al. | |
| 2014/0110004 A1 | 4/2014 | Westmeier et al. | |
| 2014/0230941 A1 | 8/2014 | De Beer et al. | |
| 2014/0321841 A1 | 10/2014 | Etscheid et al. | |
| 2014/0366974 A1 | 12/2014 | Etscheid et al. | |
| 2015/0069044 A1 | 3/2015 | Borgmeier et al. | |
| 2015/0240687 A1 | 8/2015 | Mann | |
| 2015/0240693 A1 | 8/2015 | Birman et al. | |
| 2015/0245414 A1 | 8/2015 | Birman et al. | |
| 2015/0260326 A1 | 9/2015 | Westmeier et al. | |
| 2015/0276323 A1 | 10/2015 | Li et al. | |
| 2015/0369414 A1 | 12/2015 | Schwarzkopf | |

\* cited by examiner

ELECTRICALLY CONDUCTIVE CONDUIT ASSEMBLY

CROSS-REFERENCE TO RELATED APPLICATIONS

This application claims the benefit of U.S. Provisional Application No. 62/381,862, filed on Aug. 31, 2016. The entire disclosure of the above application is incorporated herein by reference.

FIELD

The present disclosure relates to conduit assemblies and, more particularly, to electrically conductive and electrostatic discharge conduit assemblies.

BACKGROUND

This section provides background information related to the present disclosure which is not necessarily prior art.

In various industries where the heating of fluids inside of conduits is necessary, various types of apparatuses are utilized. Additionally, static charges build up occurs in heated and non-heated conduit systems. Specifically, in urea systems where resistance wires are used to thaw the urea in the lines, various solutions exist. Generally, resistance wires are wrapped around the circumference of the tubes and connectors in order to heat the pipes to thaw the urea. Additionally, heating elements are passed into the pipes to heat and thaw the urea. Also, the resin may be compound with a conductive material. The charge will move along the same conduit path as the fluid. The fluid system is ground. These types of systems have various problems generally associated with heating of the tube as well as heating of the connectors. Thus, designers are striving to improve the art.

The present disclosure provides the art with a conduit assembly that includes electrically conductive components. The electrical conductive components are manufactured from a polymeric material with a nanoparticulate component. Electrical current can be passed through an electrical contact, conduit assembly to a ground enabling the conduit to conduct electrical current or dissipate an electrostatic charge. Additionally, the heating may occur in the conduit assembly when a voltage is applied.

SUMMARY

According to a first object of the disclosure, a conduit assembly comprises a tube and at least one fluid connector connected with the tube. The tube, and maybe the connector, if desired, is formed from a polymeric material with a nanoparticulate component. The polymeric material has an electrical conductivity in a range between $1 \times 10^{-14}$ and $4.7 \times 10^6$ (S/m) at 20° C. An electrical contact is electrically coupled with the conduit assembly to receive electrical voltage. A ground wire is electrically coupled with the conduit assembly to ground the electrical current. As this occurs, the conduit assembly is heated by the electrical current. The electrical current flows between and through the connected fluid connector and tube. The conduit assembly may be used in a urea tube system.

According to a second object of the present disclosure, a method of passing electric current or electrostatic discharge through a conduit assembly comprises providing a conduit assembly formed from a polymeric material with a nanoparticulate component. An electrical contact and ground wire are electrically coupled with the conduit assembly. Electrical current is passed into the electrical contact through the conduit assembly to the ground wire. The conduit assembly is heated by the electrical current. The conduit assembly has an electrical conductivity in a range between $1 \times 10^{-14}$ and $4.7 \times 10^6$ (S/m) at 20° C.

According to a third aspect of the disclosure, a conduit assembly comprises a tube formed from a polymeric material with a nano particulate component. The polymeric material has an electrical conductivity in a range between $1 \times 10^{-14}$ and $4.7 \times 10^6$ (S/m) at 20° C. An electrical contact is coupled with the tube to receive electrical current. A ground is coupled with the tube to ground the electrical current passing through the tube. The tube may be hollow to enable fluid passage. The tube may be solid to enable the passage of electrical current. The tube may be utilized to heat fluid. Also, cooling fluid may pass through the tube.

The present disclosure may be utilized in various environments. The disclosure may be utilized for heating and cooling of batteries. Additional, it may be used for a control of electric cooling and heating. It may be utilized to heat the exhaust system of hydrogen fuel cells. The disclosure may be utilized for heating and cooling in areas such as seating, in floor, sprinkler lines, piping for pools or home use as well as heated driveways. The disclosure may be used in heated crank cases, coffeemakers, breathers for truck crank case ventilators and also cleaning of sensors for autonomous driving vehicles as well as windshield washer lines or washer lines to the sensors. Additionally, the conduit could be solid wherein the conduit could be utilized to conduct electricity through a plastic electric wire apparatus in a corrosive environment.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
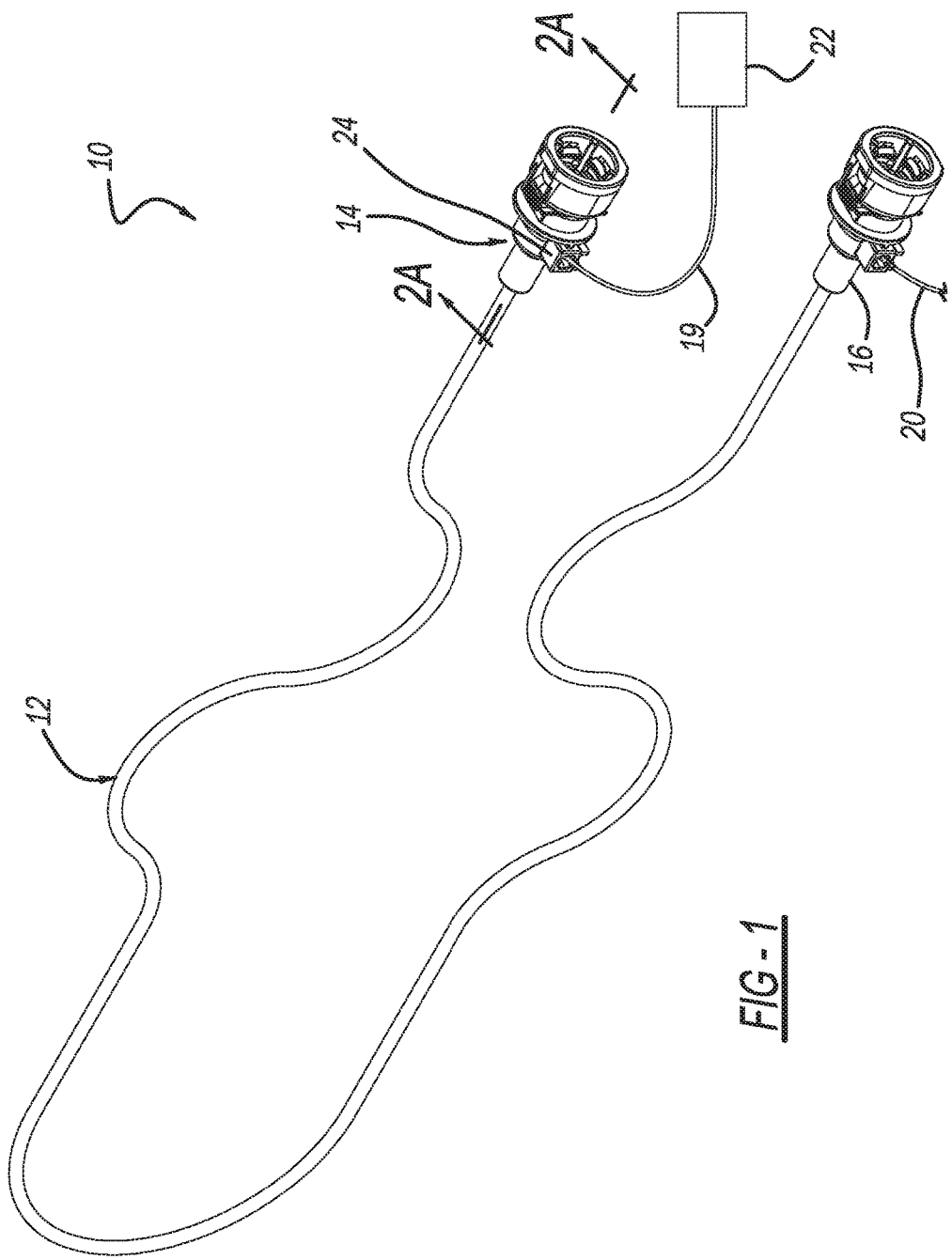
FIG. 1 is an elevation view of a conduit assembly.

Example embodiments will now be described more fully with reference to the accompanying drawings.

Turning to the figures, a conduit assembly is illustrated and designated with the reference numeral 10. The conduit assembly includes a tube 12 and at least one connector 14. A second connector 16 is illustrated.

An electrical contact 18 is illustrated electrically coupled with the connector 14. The electrical contact 18 includes an end 26 that extends from a box 24 formed by the connector 14. The end 26 receives a lead wire 19. The end 21 of the lead wire 19 functionally fits and is retained in the box 24. The remainder of the electrical contact 18 has an arcuate body 28 positioned in the connector body 14. The electrical contact 18 is molded, clamped or connected or the like into the polymeric material of the connector 14, 16 or tube 12. Additionally, a ground wire 20, similar in manufacture to the lead wire, can be electrically coupled with the second connector 14, 16 or tube 12 that includes an electrical contact 18 like that described above. The ground wire 20 is secured to end 26 of the electrical contact on the connector 14, 16 or tube 12 like the lead wire. The lead wire 19 and ground wire 20 are electrically coupled with electrical contacts 18 on the connector 14, 16 or tube 12. Thus, an electrical current source (such as a wire harness) 22 can be electrically coupled with the electrical contact 18 so that an electrical current can flow through the conduit assembly 10 to the ground wire 20. As this occurs, the electrical current heats the conduit assembly, like a filament, to a desired temperature.

Figure 2A:
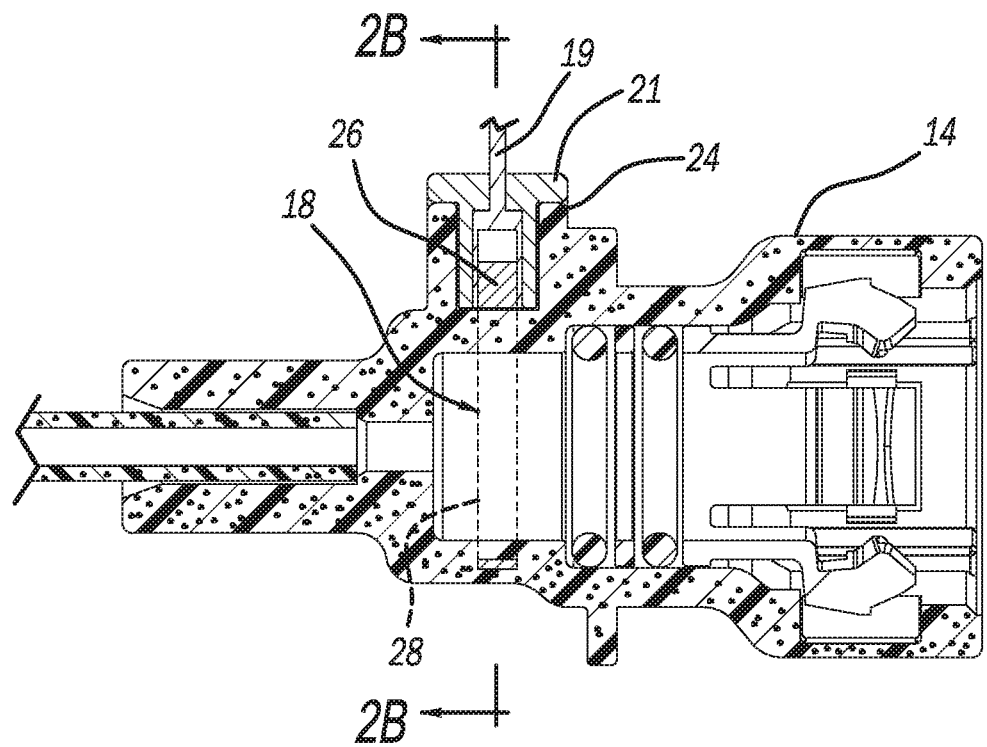
FIG. 2A is a cross-section view of FIG. 1 along lines 2A-2A.
Figure 2B:
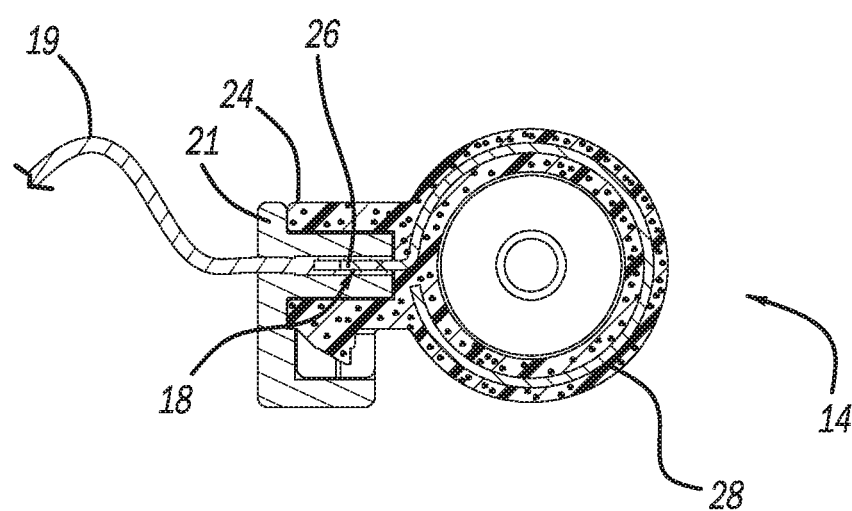
FIG. 2B is a cross-section view of FIG. 1 along lines 2B-2B.

As can be seen in FIG. 2, the connectors 14, 16 are mechanically connected with the tube 12. The connection of the tube 12 with the connectors 14, 16 enables the electrical current to pass directly between the connectors 14, 16 to the tube 12. Thus, the conduit assembly 10 acts as an electrical connection to enable electrical current to flow through the conduit assembly 10 to heat the conduit assembly 10 with the electric current.

The tube 10 and connectors 14, 16 are formed or manufactured from the same or similar polymeric material. The polymeric material includes at least one polymer component, the at least polymer component having a modified backbone. The polymer component may include at least one of the following: polyester, polyols, copolyesters, polyacrylates, polysulfides, polyolfins, polyamines, polyurethane.

A nanoparticulate component is incorporated into the backbone or a side chain present in the polymer component. The nanoparticulate component is of at least one inorganic functional nanoparticulate compound. The nanoparticulate component is present in an amount sufficient to provide an electrical conductivity (a) in a range between $1 \times 10^{-14}$ and $4.7 \times 10^6$ (S/m) at 20° C. The nano particles can be selected from the group consisting of iron, copper, lead, silver, nickel, cobalt, carbon graphite, manganese's and mixtures thereof.

The polymeric composition with the nanoparticulate compound is illustrated in U.S. Pat. No. 9,074,053 B2 entitled "Polymeric Composition With Electroactive Characteristics", assigned to Mackinac Polymers, LLC, the specification and drawings of which are herein incorporated by reference.

Thus, an electric current is passed from the source 22 through the conduit assembly 10. The conduit assembly 10, with its electric contact 18 and ground wire 20, enables the electrical current to pass through the connectors 14, 16 and tube 10 manufactured from the polymeric material with a nanoparticulate component. Thus, the conduit assembly 10 is heated by the electrical current.

This type of conduit assembly may be utilized in urea systems to thaw the urea during its use. These urea systems are generally utilized in automobiles with diesel engines equipped with selective catalytic reduction exhaust treatment systems. A reducing agent such as urea or diesel exhaust is injected into the engine exhaust stream to cause a chemical reaction that converts the nitrogen oxide into nitrogen and water. A challenge encountered when using urea or the diesel exhaust fuel as a reducing agent is that it freezes at around −11° C. and therefore it cannot be pumped through the tubes.

Additionally, the conduit assembly could be utilized in any operation where a heated conduit is desired. Windshield washer lines, water lines, dispensing lines (such as soap) are types of line where heating is desirable.

Figure 3:
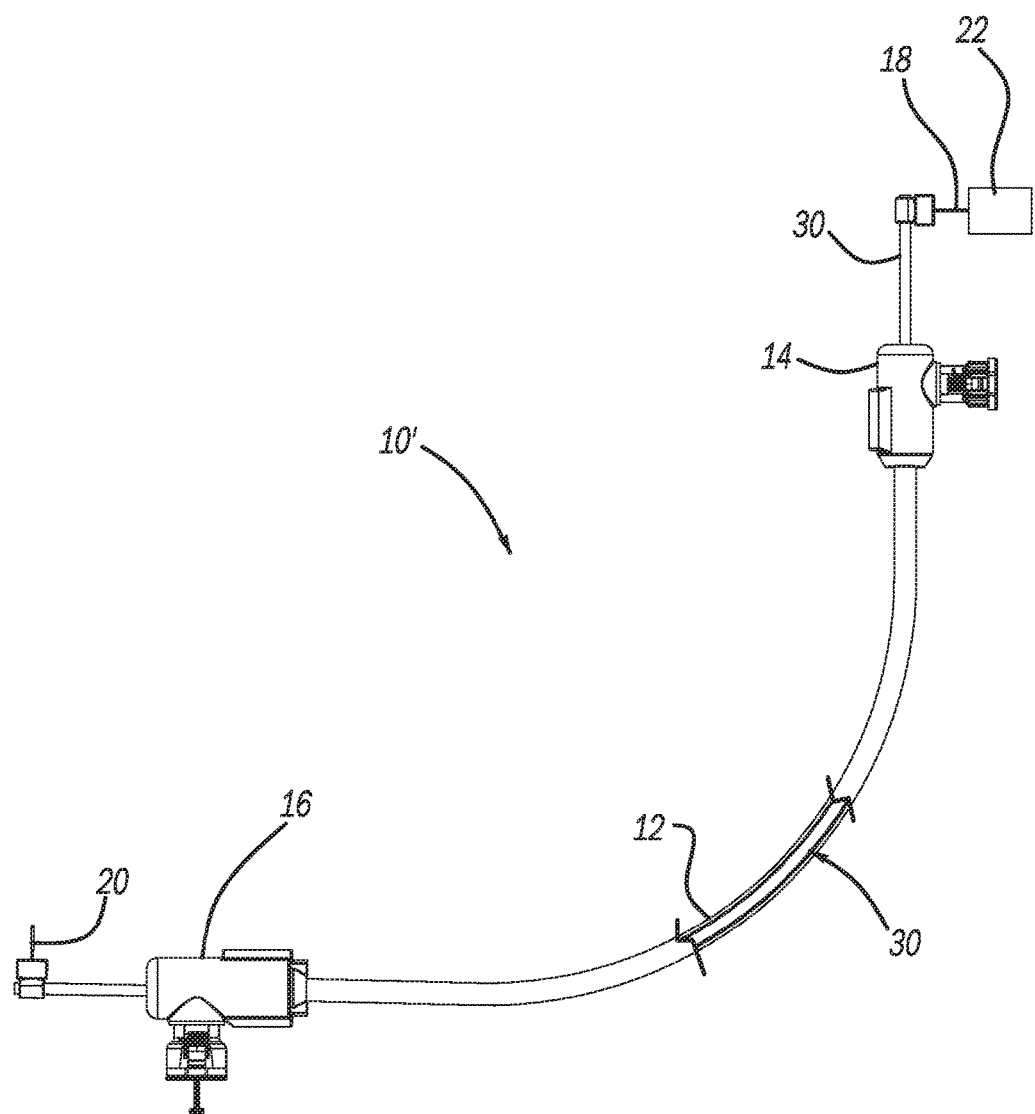
FIG. 3 is a perspective partially in cross-section view of another embodiment.

Turning to FIG. 3, an additional embodiment is illustrated. Here, the elements that are the same are identified with the same reference numerals.

A second conduit assembly 10' includes a tube 12, at least one fluid connector 14 and a second fluid connector 16. A heating rod 30 passes through the conduit assembly 10'. The heating rod 30 is manufactured from the above described polymeric material. An electrical contact 18 is electrically coupled with one end of the heating rod 30. A ground 20 is coupled with the other end of the heating rod 30. Current is passed through the heating rod 30. The heating rod 30 is utilized as a filament, as explained above, to heat fluid in the conduit. The heating rod 30 can be solid or it can include a through bore. Additionally, the heating rod 30 could be removed from inside of the conduit and be wrapped around the outer circumference of the tube 12.

Figure 4:
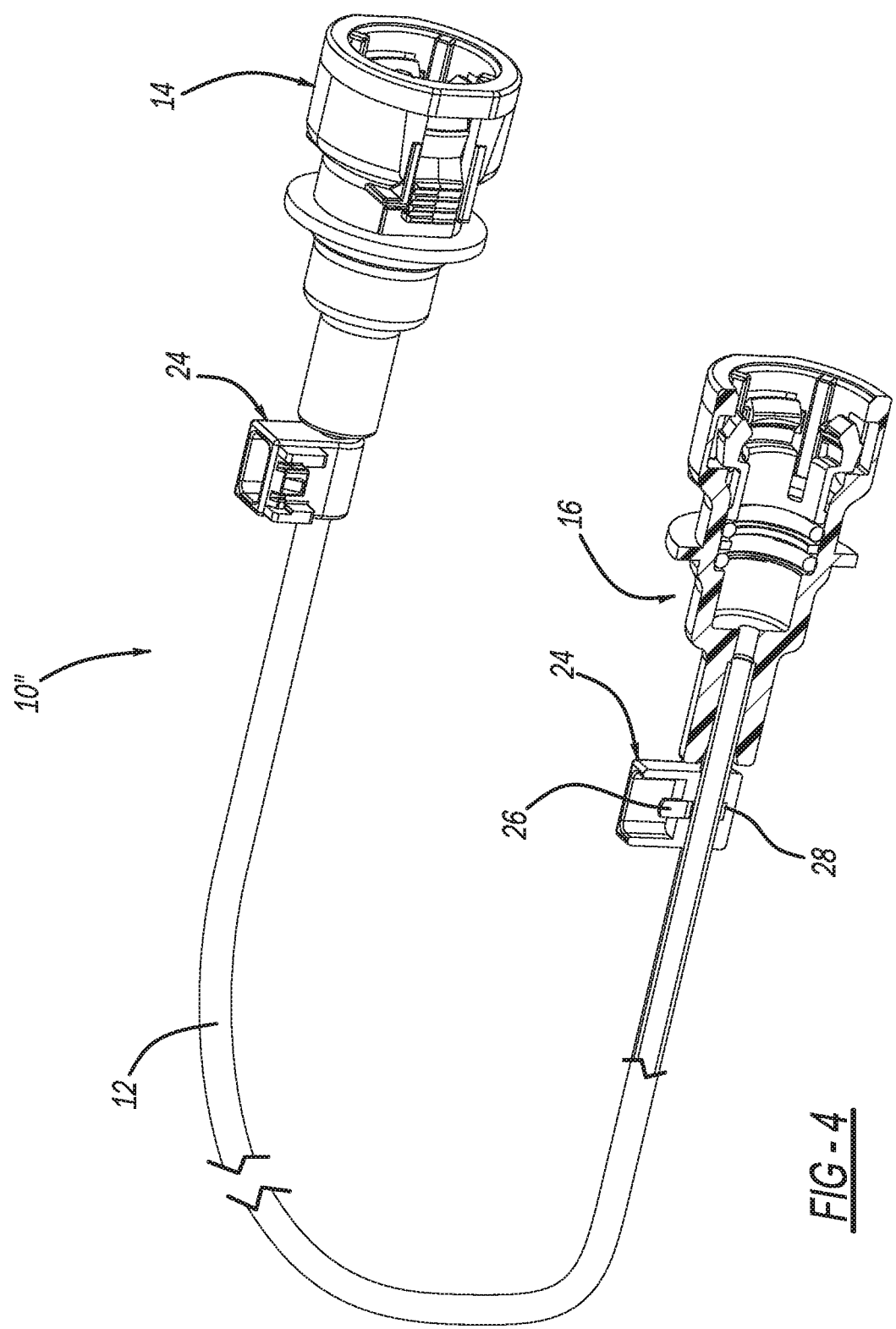
FIG. 4 is a perspective view of another embodiment.

FIG. 4 is an illustration like FIG. 1. In FIG. 4, the elements identified above have been identified with the same reference numerals. Here, the conduit assembly 10" includes the electrical contact 18 in a self-standing box 24 connected directly to the tube 12. Also, the ground 20 electrically couples with the tube 12. Thus, the voltage or current is passed through the tube 12 to heat the fluid as explained above. Here, the fluid connectors, if heated, would be heated by conductive heating by heat of the tube 12. Additionally, the connectors 14, 16 need not be manufactured from the same material as the tube. The tube is manufactured from the material as described above.

Figure 5:
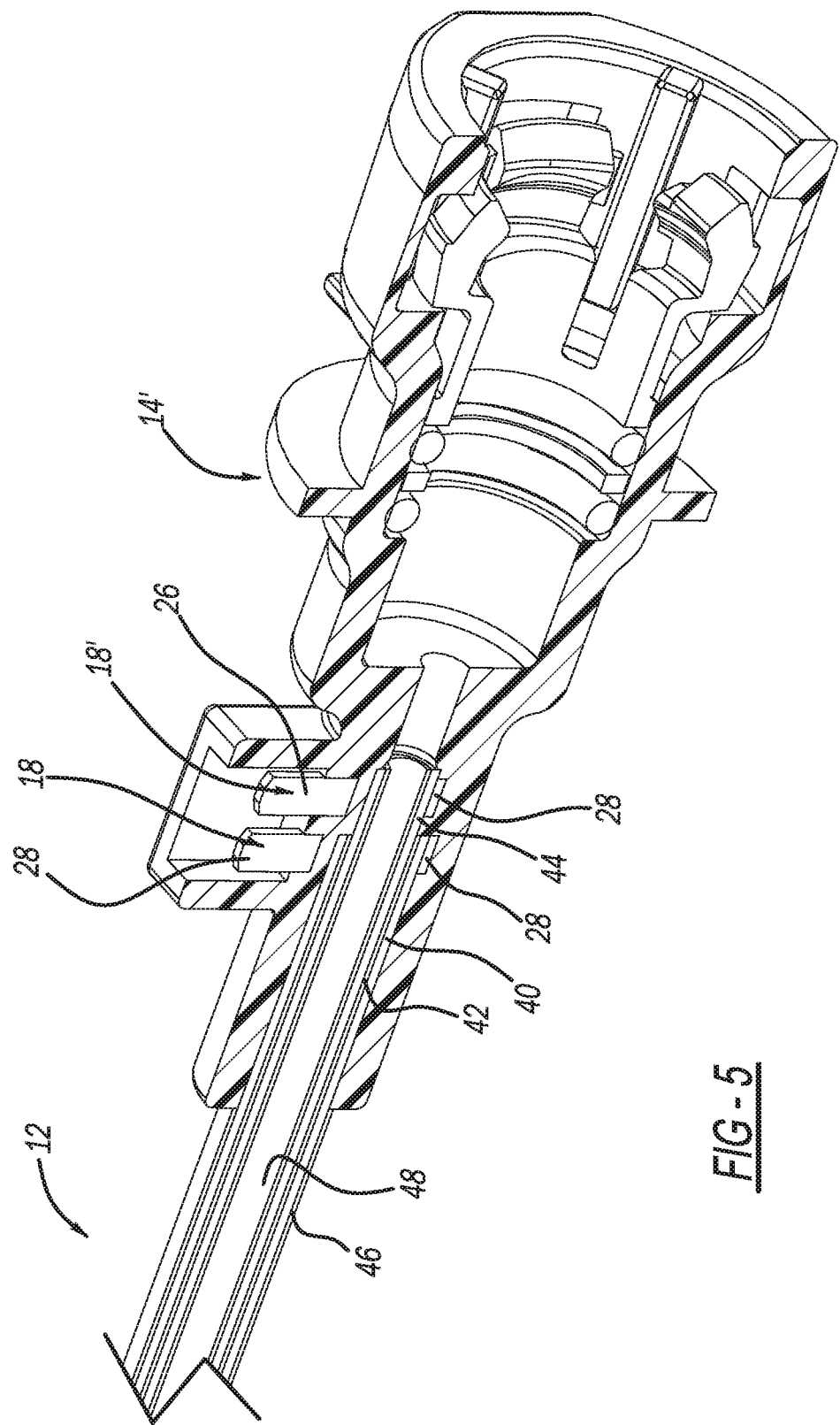
FIG. 5 is a cross-section view of another embodiment.

FIG. 5 illustrates an additional embodiment of the disclosure. Here, the tube 12 is a multi-layer tube having five layers. The first layer 40 is manufactured from the material described above. This layer could be a mesh layer. The second layer 42 is non-conductive layer sandwiched between the first and third layers. The third layer 44 is a conductive layer like that described above and also could be a mesh layer. The fourth outer layer 46 is a non-conductive outer covering layer. The fifth layer 48 is a non-conductive inner layer. The connector 14' includes a pair of electrical contacts 18, 18'. The electrical contacts 18, 18' are attached to one or the other of the conductive first and third layers 40, 44. Thus, a lead line 19 can be connected to contact 18 and the ground 20 to the contact 18'. Additionally, at the other end of the conduit assembly, there is a similar connector attached to first and third layer 40, 44. The electrical contacts 18, 18' are electrically connected to the first and third layers 40, 44 to route the current from contact 18, through layer 40, back through layer 44, to ground 18'. Thus, the current is also able to pass through the tube 12 to heat the tube which, in turn, heats fluid inside the tube.

Figure 6:
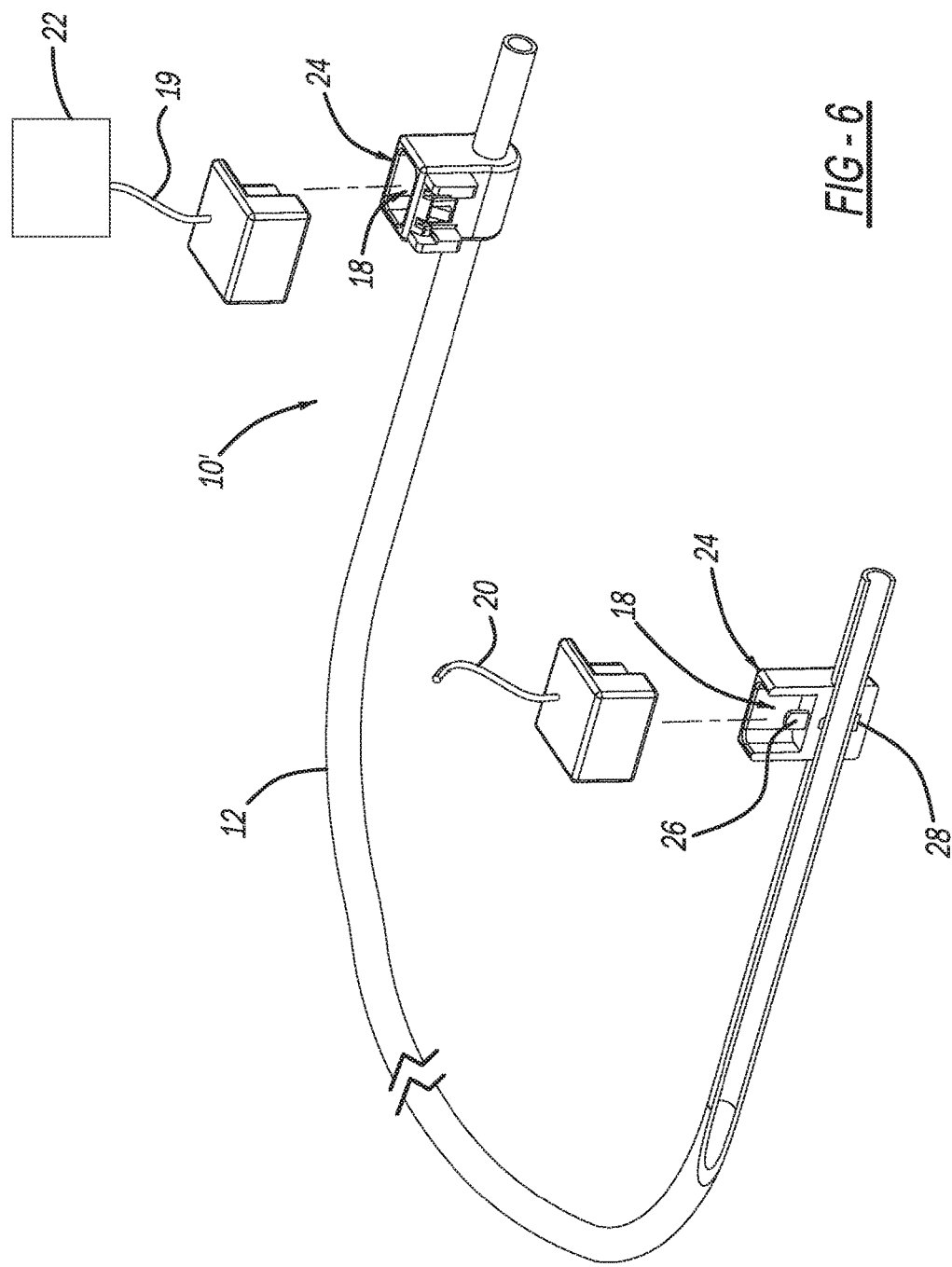
FIG. 6 is a perspective view of another embodiment.
Figure 7:
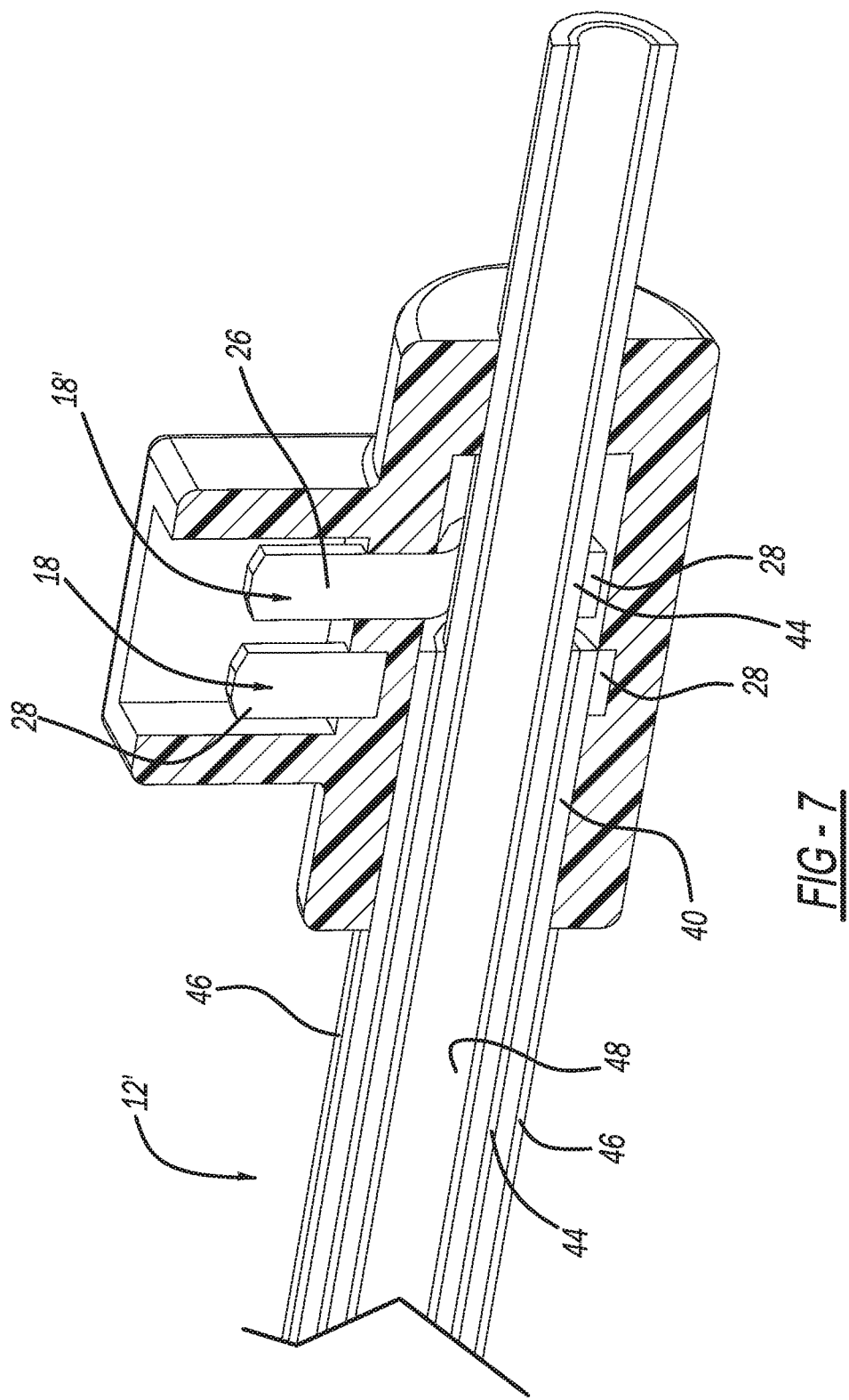
FIG. 7 is another cross-section view of another embodiment.
Figure 8:
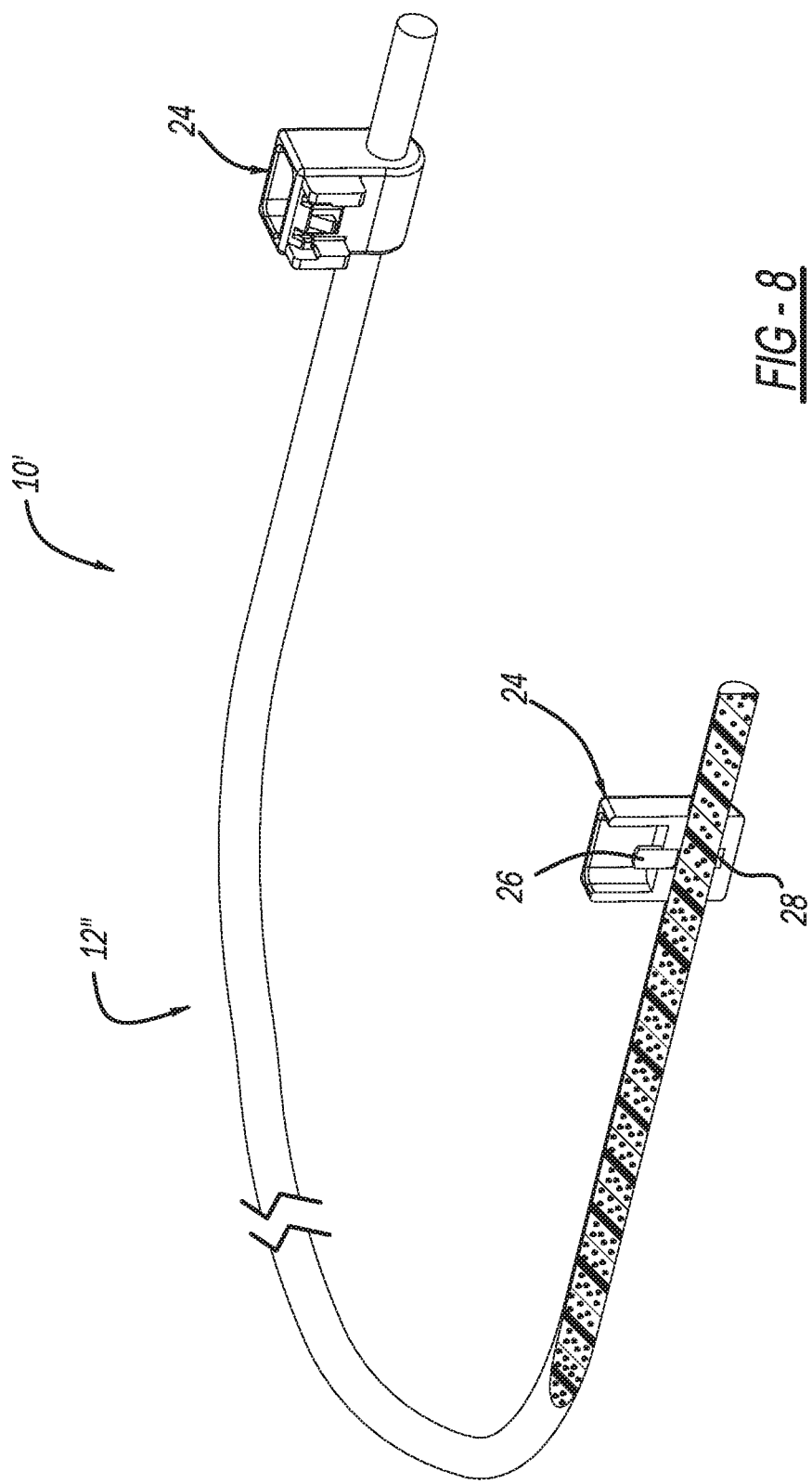
FIG. 8 is a cross-section view of an additional embodiment.

In FIGS. 6-8, the embodiments are like those above. Accordingly, the same reference numerals have been utilized to identify similar or the same element. Thus, the full explanation of the element has been omitted.

In FIG. 6, a conduit is illustrated with a tube 12 with a pair of an electrical contacts 18. The electrical contacts include a contact end 26 that extends from a box 24. An arcuate body 28 extending from the end 26 and is positioned in the connector box peripherally about the tube 12. An electrical current source 22 is generally coupled with the electrical contact 18 so that current can flow through the tube 12 to the ground wire 20. As this occurs, electrical current is passed through the tube 12.

In FIG. 7, a second tube 12 is illustrated. Here, the contact includes a pair of electrical contacts 18, 18'. The pair of electrical contacts includes the arcuate members 28 sandwiched between the different layers as identified in FIG. 5. Thus, the tube has two conductive layers 40, 44 with a non-conductive layer between the two. An outer layer 46 and inner layer 48 are also non-conductive layers. Thus, the electrical contacts 18, 18' can receive the live wire as well as the ground wire for passing the current through the tube. A jumper connection, like that described above, is at the other end of the tube.

FIG. 8 is similar to that of FIG. 6. However, the tube 12" is solid. Accordingly, fluid does not pass through the tube. The tube 12" acts as a wire to enable current to pass through the tube 12". Thus, this plastic wire may be utilized in corrosive applications. Additionally, a multilayer solid tube or wire may be utilized like that in FIG. 7.

The present disclosure may be utilized in electrostatic discharge applications in fuel lines. Typically, in fuel lines, the movement of the fluid can, over time, lead to a buildup of electrostatic charge in nonconductive materials. Here, the buildup can eventually lead to arcing between nearby components. This can lead to small holes in the conduit assembly enabling fluid to leak from the conduit. By contrast, by utilizing a conduit assembly of the present disclosure, this type of leaking can be overcome. Here, by constructing the tube out of a conductive material and electrically connecting it to ground, the tube can dissipate the electrostatic charge and avoid arcing. Thus, the present disclosure may be utilized in fluid conduit systems to dissipate electrostatic discharge.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A conduit assembly comprising:
   a tube and at least one connector connected with the tube;
   the tube and at least one connector are formed from a polymeric material including a chain with a nanoparticulate component incorporated into the chain of the polymeric material, the polymeric material having an electrical conductivity in a range between $1\times10^{-14}$ and $4.7\times10^6$ (S/m) at 20° C.;
   an electrical contact electrically coupled with the conduit assembly for receiving electrical current; and
   a ground electrically coupled with the conduit assembly for grounding the electrical current, the electrical current electrically passes through the tube while the conduit assembly is heated by the electrical current.

2. The conduit assembly of claim 1, wherein the electrical current flows through the at least one connector and tube.

3. The conduit assembly of claim 1, wherein the conduit assembly is a urea tube system.

4. A method of passing electric current through a conduit assembly comprising:
   providing a conduit assembly formed from a polymeric material including a chain with a nanoparticulate component incorporated into the chain of the polymeric material;
   providing an electrical contact electrically coupled with the conduit assembly;
   providing a ground electrically coupled with the conduit assembly;
   passing electrical current into the electrical contact and electrically through the conduit assembly to the ground; and
   heating the conduit assembly with the electrical current.

5. The method of claim 4, further comprising the conduit assembly having an electric conductivity in a range of $1\times10^{-14}$ to $4.7\times10^6$ (S/m) at 20° C.

6. A conduit assembly comprising:
   a tube, the tube is formed from a polymeric material including a chain with a nanoparticulate component incorporated into the chain of the polymeric material, the polymeric material having an electrical conductivity in a range between $1\times10^{-14}$ to $4.7\times10^6$ (S/m) at 20° C.;
   an electrical contact coupled with the tube for receiving electrical current; and
   a ground coupled with the tube for grounding, the electrical current electrically passing through the tube.

7. The conduit assembly of claim 6, wherein the tube has a hollow bore enabling passage of fluid.

8. The conduit assembly of claim 6, wherein the tube is solid enabling passage of the electrical current.

9. The conduit assembly of claim 7, wherein the tube heats fluid in the hollow bore.

10. A conduit assembly for electrostatic discharge comprising:
    a tube, the tube is formed from a polymeric material including a chain with a nanoparticulate component incorporated into the chain of the polymeric material, the polymeric material having an electrical conductivity in a range between $1\times10^{-14}$ to $4.7\times10^6$ (S/m) at 20° C.; and
    a ground coupled with the tube for grounding the electrostatic charge present in the tube by enabling the electrostatic charge to electrically pass through the tube.

11. The conduit assembly of claim 10, wherein the tube has a hollow bore enabling passage of fluid.

* * * * *